Dec. 19, 1933.  J. JACOBSON  1,940,216
LAWN MOWER
Filed Dec. 16, 1932  2 Sheets-Sheet 1

INVENTOR
Jubelina Jacobson
BY Benjamin Webster
ATTORNEY

Dec. 19, 1933.　　　J. JACOBSON　　　1,940,216
LAWN MOWER
Filed Dec. 16, 1932　　　2 Sheets-Sheet 2

INVENTOR
Jubelina Jacobson
BY Benjamin Webster
ATTORNEY

Patented Dec. 19, 1933

1,940,216

UNITED STATES PATENT OFFICE 1,940,216

LAWN MOWER

Jubelina Jacobson, Brooklyn, N. Y.

Application December 16, 1932
Serial No. 647,525

2 Claims. (Cl. 56—25)

This invention relates to devices for mowing grass commonly called lawn mowers.

The objects of the invention are to provide a lawn mower that cuts grass of any height, that is adjustable to vary the height of the cut grass, that can trim the grass around walls, fences, trees, monuments, bushes, hedges, etc., that has adjustable and removable cutting knives or blades, that is belt driven by a self-contained electric motor, and that is light, durable, compact, and easily manipulated.

In the form disclosed a two-wheeled truck has an upwardly inclined wooden handle at the rear and a forwardly projecting frame. Mounted on the frame and extending forwardly like the palm of the hand is a flat frame terminating in a front semicircular row of forwardly directed acute-angled fingers or teeth pointed at the front and separated by acute-angled spaces in which the upstanding grass enters as the machine is moved forwards. This flat frame supports in the front a horizontally mounted wooden roller the end bearings of which are adjustable to vary the distance of the bottom of the flat frame from the ground or lawn and so to determine the height of the cut grass as well as furnishing a solid foundation for the frame. A circular wheel is mounted concentrically over the flat frame carrying on its periphery a series of cutting knives adjustably and removably mounted in inclined slots by set screws at an inclination of approximately forty-five degrees, the circle of the periphery of the points of the cutting knives being at least one-eighth inch to the rear of the circle of the periphery of the points of the fingers or teeth of the lower flat frame. This circular wheel is mounted by means of a vertically adjustable roller bearing on a shaft the lower end of which is mounted in a forward extension of the truck frame. Above the circular wheel a pulley wheel with a belt groove is secured to turn synchronously. A second vertical shaft is mounted in the frame at the rear having a small grooved pulley wheel secured at the lower end and lying in the same horizontal plane as the larger front pulley wheel and connected therewith by a belt. Secured to the top of the second vertical shaft is a bevel gear which coacts with a small bevel gear mounted on the end of the motor shaft. A suitable protective cover over the machine also provides a guard. When the electric motor is actuated the knives rotate in a clockwise direction.

Reference is made to the drawings in which

Figure 1:
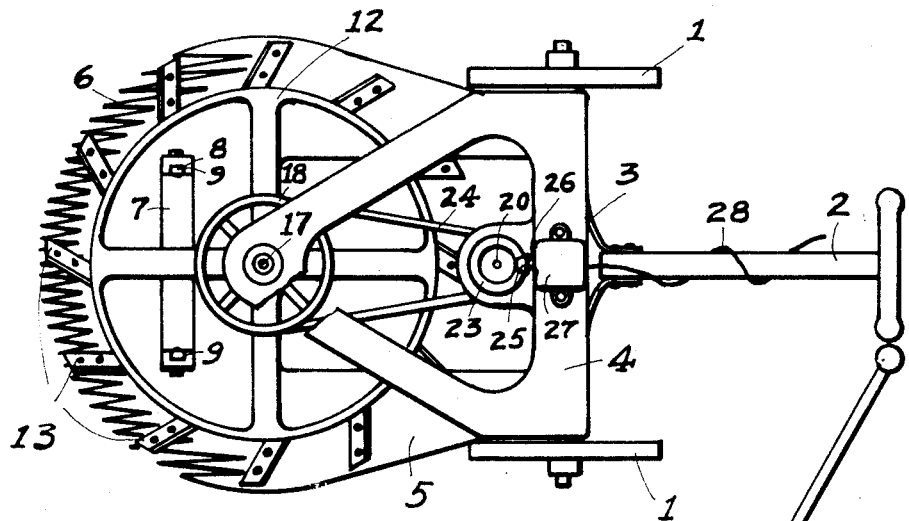
Fig. 1 is a plan view.
Figure 2:
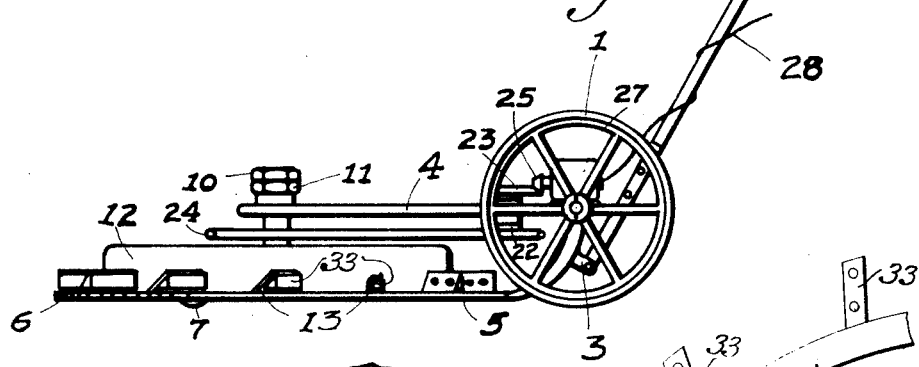
Fig. 2 is a side elevation.
Figures 4, 6:
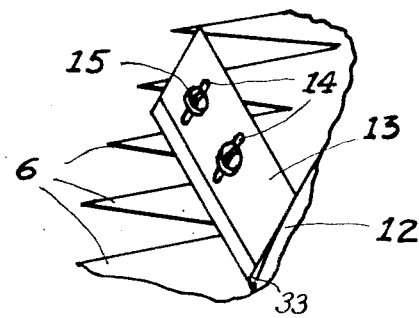
Fig. 4 is an enlarged detail plan view showing one of the knives.
Fig. 6 is a plan view of a part of the wheel showing a supporting extension from the wheel.
Figure 3:
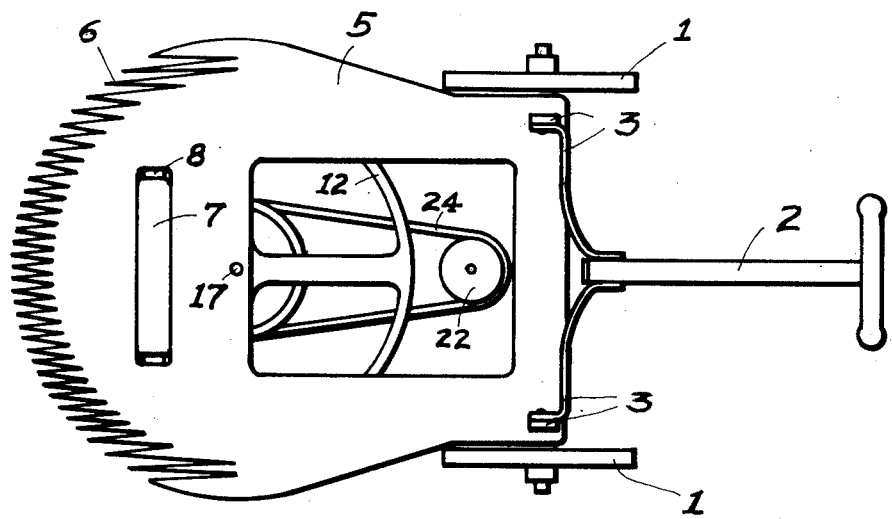
Fig. 3 is a bottom view.
Figure 5:
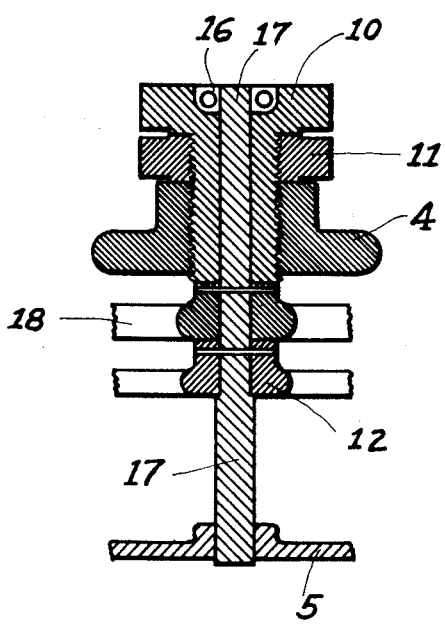
Fig. 5 is a vertical section through the adjustable wheel bearing.

Two wheels 1 support the mowing machine which is pushed and guided by an upwardly and rearwardly extending handle 2 which is connected with the machine by the brackets 3. The rear part of the machine comprises a frame 4 having forward extensions or cross-pieces which comprise the upper structure of the machine, and a lower flat frame 5 which terminates at the forward end in acute-angled fingers or teeth 6 which act like a comb to assemble and to collect bunches of grass in the oppositely angled interstices. The frame 5 is supported at a predetermined distance from the ground or lawn by a transversely mounted roller 7 having a shaft 8 in bearings 9 which permit of a vertical adjustment of the roller with reference to the frame 5.

The vertically adjustable bearing 16 carries an adjusting nut 10 and a lock nut 11 which locks the bearing in the adjusted position on the frame 4 and the wheel 12 and pulley wheel 18 are interlocked to rotate synchronously with the shaft 17. On the periphery of the wheel 12 there are mounted on inclined extensions 33 a plurality of knives 13 which rotate in a clockwise direction to shear the grass collected between the fingers 6. Oblique slots 14 in each knife 13 coact with screws 15 fastened on the extensions 33 of the wheel 12 and permits the vertical adjustment of the knives or detachment for sharpening.

A vertical shaft 20 is mounted in the frame 4 at the rear and a small pulley wheel 22 is mounted in the same horizontal plane as the pulley wheel 18. Also mounted on the shaft 20 over the pulley wheel 22 is a bevel gear 23 which coacts with a small bevel gear 25 secured on the end of the shaft 26 of the electric motor 27 to which is secured the electrical cable 28 which is of suitable length to permit a wide range of movement of the lawn mower.

The points of the knives 13 are preferably set about one-eighth of an inch back of the points of the fingers 6 so that the lawn mower can be pushed up close to trees, walls, or stones and make a close trim. By the use of an aluminum alloy in the construction of many parts of the machine a light-weight structure is procured. It will also be understood that a small gas engine may be substituted for the electric motor.

The operation is now clear. When the electric motor is actuated the bevel gear 25 rotates in mesh with the bevel gear 23 which turns the small pulley 22 and actuates the belt 24 to rotate the pulley wheel 18 and synchronously the wheel 12 and the knives 13 in a clockwise direction. The vertically adjustable bearing 16 permits a vertical adjustment of the wheel and the knives with reference to the lower plate. By loosening the screws 15 the knives may be adjusted individually or removed to sharpen the cutting lower edge of each. To adjust the height of the cut grass the bearings 9 of the roller 7 are raised or lowered.

Having now disclosed one embodiment of my invention and realizing that in view of my disclosure many changes in detail of construction will readily occur to those skilled in the art but within the spirit and scope of my invention, I do not choose to limit myself except as in the appended claims.

I claim:

1. A mowing machine comprising in combination, a two-wheeled truck comprising a frame, a rearwardly extending handle connected therewith, a forward upper extension from said frame, a forward lower extension from said frame having at the front end a semicircular series of acute-angled fingers, a roller mounted transversely in the front portion of said lower frame, a wheel rotatably mounted on said lower frame, a plurality of extensions from the periphery of the wheel inclined with reference to the plane thereof, a plurality of knives mounted on the extensions, the periphery of the semicircular series of fingers extending beyond the points of the knives, said knives being inclined to the plane of the wheel at an angle of approximately forty-five degrees, slots in said knives and setscrews extending through said slots into the extensions, the wheel which carries the knives being mounted concentrically with respect to the semicircular series of fingers, a pulley concentrically mounted on the wheel, a belt for rotating said pulley, a second pulley horizontally mounted in the upper extension of said frame to the rear of the first pulley and connected therewith by said belt, and means for rotating said second pulley.

2. A mowing machine comprising in combination, a two-wheeled truck comprising a frame, a rearwardly extending handle connected therewith, a forward upper extension from said frame, a forward lower extension from said frame having at the front end a semicircular series of acute-angled fingers, a roller mounted transversely in the front portion of said lower frame, a wheel rotatably mounted on said lower frame, a plurality of extensions from the periphery of the wheel inclined with reference to the plane thereof, a plurality of knives mounted on the extensions, the periphery of the semicircular series of fingers extending beyond the points of said knives, said knives being inclined with reference to the plane of the wheel at an angle of approximately forty-five degrees, slots in said knives and setscrews extending through said slots into the extensions, the wheel which carries the knives being mounted concentrically with respect to the semicircular series of fingers, a pulley concentrically mounted on said wheel, a belt for rotating said pulley, a second pulley horizontally mounted in the upper extension of said frame to the rear of the first pulley, and connected therewith by said belt, and means for rotating said pulleys comprising a gear wheel concentrically connected with said second pulley, a motor, and a gear wheel mounted on the shaft of said motor and engaging said first gear wheel.

JUBELINA JACOBSON.